United States Patent [19]

Mahaney et al.

[11] Patent Number: 5,044,983
[45] Date of Patent: Sep. 3, 1991

[54] DEFORMABLE MOUNTING STRAP FOR WIRING DEVICE

[75] Inventors: John T. Mahaney, Baldwinsville; Edward B. Hubben, Skaneateles, both of N.Y.

[73] Assignee: Pass & Seymour, Inc., Syracuse, N.Y.

[21] Appl. No.: 534,494

[22] Filed: Jun. 7, 1990

[51] Int. Cl.$^5$ .......................................... H01R 13/60
[52] U.S. Cl. ..................................... 439/539; 439/538
[58] Field of Search ............................ 174/53, 59, 57; 220/3.6, 3.7; 439/538, 539, 569, 570, 571

[56] References Cited

U.S. PATENT DOCUMENTS 1,807,410  5/1931  Hubbard .......................... 439/538 X
1,999,475  4/1935  Parker ................................. 439/539

Primary Examiner—Eugene F. Desmond
Attorney, Agent, or Firm—Charles S. McGuire

[57] ABSTRACT

A mounting strap for attaching a wiring device to a utility box behind a wall opening. The mounting strap is fixedly connected to the wiring device body and includes ears extending outwardly from opposite ends of the device and having the usual openings for loose passage of mounting screws. The openings are surrounded by a deformable portion connected to an adjoining area of the strap by a bendable portion. The deformable portion is separated from other adjoining areas by cutout or structurally weakened areas, whereby tightening of the mounting screws causes the bendable portion to bend, moving the deformable portion relative to and out of the plane of the adjacent areas of the ears as such areas are maintained in their original plane, e.g., by terminal edge portions of the ears engaging the wall surface adjacent the opening therein providing access to the utility box.

7 Claims, 2 Drawing Sheets

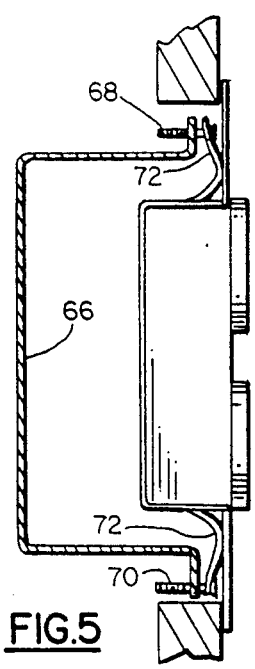
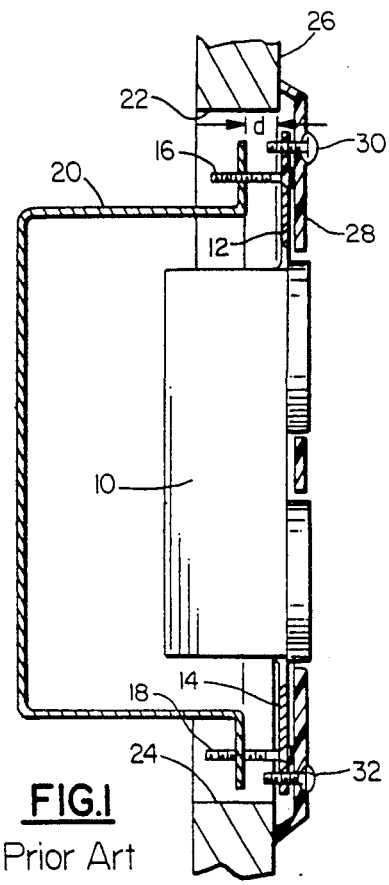
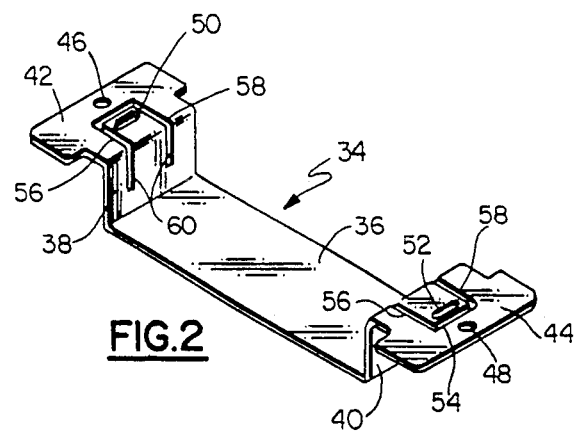
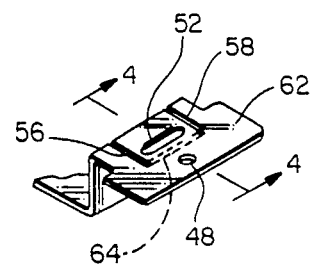
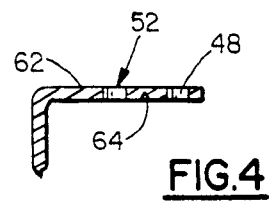
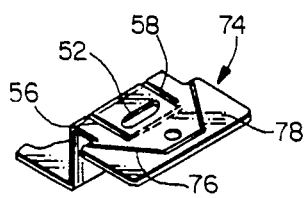
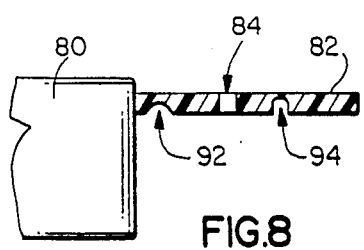
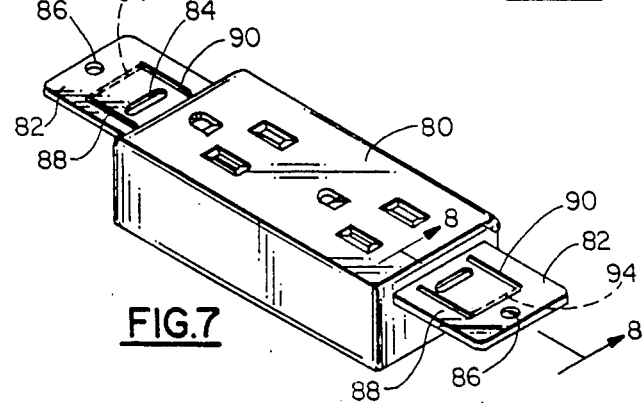

DEFORMABLE MOUNTING STRAP FOR WIRING DEVICE

BACKGROUND OF THE INVENTION

The present invention relates to mounting straps for electrical switches, receptacles, and the like, and more particularly to novel and improved mounting straps which permit safer and more secure mounting of a wiring device in a "trade" or utility box.

Wiring devices such as light switches and receptacles are commonly mounted within the walls of domestic and commercial structures in open-front boxes attached to the studs or other supporting structure behind an opening in the wall surface. The boxes are of generally standard design and include threaded openings at the top and bottom to receive screws which pass through openings in ears or other such portions of the mounting strap, sometimes referred to as a yoke. The ears extend outwardly above and below the wiring device to which the mounting strap is securely attached.

The National Electric Code specifies that the surface of the box to which the mounting strap is secured shall be mounted not more than ⅛ inch behind the surrounding, outer wall surface. However, this rule is not always followed, and boxes are often mounted more than the allowed distance behind the wall surface. Also, the wall openings may be cut too large for the ends of the mounting strap to bridge the opening and rest against the wall surface. In such cases, if the screws passing through the mounting strap are tightened in the threaded openings of the box, the wiring device will be set too deeply in the wall. When inward pressure is exerted on the wiring device, it can move farther into the box. This results in cracking of the wall plate which is secured to the device in covering relation to the face thereof and which rests against the wall surface about the periphery of the opening. A cracked wall plate, in addition to the obviously objectionable appearance, creates potential safety problems.

It is a principal object of the present invention to provide a mounting strap which may be securely fastened to a box behind a wall opening while ensuring that the face of the wiring device is flush with the surrounding wall surface.

A further object is to provide a wiring device mounting strap having a deformable area around the mounting screw openings that allows the device to be always mounted flush with the wall surface with the screws securely fastened to draw the mount strap tightly against the mounting surface of the box.

In a more general sense, the object of the invention is to provide a wiring device mounting strap which permits a safer and more secure mounting of the wiring device and its associated wall plate.

Other objects will in part be obvious and will in part appear hereinafter.

SUMMARY OF THE INVENTION

In accordance with the foregoing objects, the invention contemplates a mounting strap having a pattern of cut-out and/or weakened areas adjacent to the holes at each end through which the mounting screws pass. As in conventional straps, the screws pass loosely through the holes in the strap and are threaded into tapped openings in the utility box fixedly mounted behind the wall opening which receives the wiring device. As the screws are tightened, areas of the strap surrounding the screw holes are bent or otherwise deformed from the plane of adjacent strap portions.

Mounting straps embodying the invention are disclosed in a number of variations. In the preferred embodiment, two separate areas are punched out of the strap at each end. Both areas are generally U-shaped, with the legs of the U straddling the mounting screw hole. The open end of the U nearest the hole faces the center of the strap, and the open end of the U-shaped area farthest from the hole faces the end of the strap. This produces a bending at two points on each side of the mounting screw hole as the screw is tightened, permitting the deformed section to remain in a plane parallel to but spaced from the plane of the adjacent, non-deformed area. Also, the face of the wiring device is positioned at the proper height relative to the finished wall surface.

The foregoing, generally described features, and other details of the design of the improved mounting straps will be more readily understood and fully appreciated from the following detailed description, taken in conjunction with the accompanying drawings.

BRIEF DESCRIPTION OF THE DRAWINGS

FIG. 1 is a side elevational view, in vertical section, of a typical wiring device installation of the prior art;

FIG. 2 is a perspective view of a first embodiment of the mounting strap of the invention;

FIG. 3 is a fragmentary, perspective view of an end portion of a mounting strap having a design modified from that of the FIG. 2 strap;

FIG. 4 is a fragmentary, side elevational view of a portion of the strap of FIG. 3, in section on the line 4—4 thereof;

FIG. 5 is a side elevational view, partly in section, of a wiring device installation incorporating the strap of FIG. 2 or 3;

FIG. 6 is a fragmentary, perspective view of an end portion of another embodiment of the mounting strap;

FIG. 7 is a perspective view of a duplex receptacle having a mounting strap of a still further variation;

FIG. 8 is an enlarged, fragmentary, side elevational view, in section on the line 8—8 of FIG. 7;

DETAILED DESCRIPTION

Figure 9:
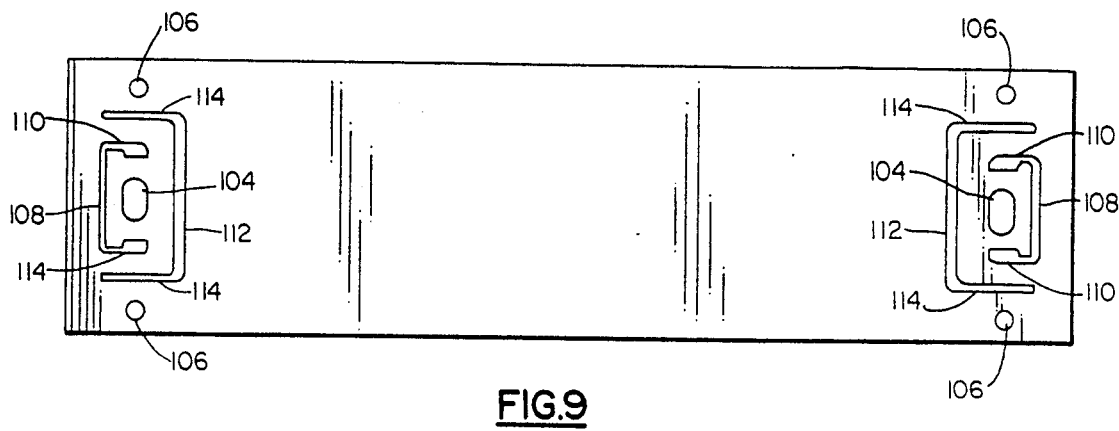
FIG. 9 is a plan view of the preferred embodiment of the strap.

In FIG. 1 is shown a typical prior art wiring device installation. The wiring device illustrated in FIG. 1, and in Figures subsequently discussed in connection with the present invention, is a duplex receptacle, although it will be understood that the invention may be practised with other forms of wiring devices. Receptacle 10 includes the usual mounting strap having ears 12 and 14 extending outwardly on opposite sides thereof. Mounting screws 16 and 18 pass loosely through openings in ears 12 and 14, respectively, and are threaded into tapped openings in mounting tabs at the top and bottom of utility box 20 which is fixedly mounted (e.g., by nailing to a stud) within a wall. The open front of the box is positioned directly behind an opening, the upper and lower edges of which are denoted by reference numerals 22 and 24, respectively, in a wall having outer surface 26.

According to the National Electric Code, the maximum permissible distance d, from the plane of wall surface 26 to the front surface of the mounting tabs on box 20 is ⅛ inch. However, this practise is not uniformly followed, and the boxes are often mounted more than the maximum permissible distance behind the wall surface. When boxes are set too deeply it is common in the building trade not to tighten the mounting screws to the point that the wiring device would be pulled into the wall opening. Thus, since the mounting screws pass loosely through the holes in the mounting strap ears, the wiring device is only loosely attached to the box.

Wall plate 28, having openings to expose the necessary portions of receptacle 10, is attached by screws 30 and 32 in covering relation to the receptacle and wall opening. The periphery of plate 28 rests against wall surface 26. Screws 30 and 32 are received in tapped openings in ears 12 and 14 of the mounting strap. As screws 30 and 32 are tightened receptacle 10 is pulled outwardly to make a rigid assembly. Also, the rigid mounting strap does not always bridge the wall opening, permitting the wiring device to move inwardly when pressure is applied, as when a plug is inserted into receptacle 10. Wall plates are commonly made of relatively thin and brittle plastic, and may crack or break when such stresses are applied, thus posing both esthetic and safety problems.

In FIG. 2 is shown a mounting strap, denoted generally by reference numeral 34, representing a first embodiment of the present invention. Strap 34 includes medial portion 36, legs 38 and 40, and ears 42 and 44. Tapped openings 46 and 48 adjacent the outer ends of ears 40 and 42, respectively, are provided to receive the screws which fasten the wall plate to strap 34 as described in connection with FIG. 1. The mounting screws which attach the wiring device of which strap 34 is a part to the utility box pass loosely through elongated openings 50 and 52. In the foregoing respects, strap 34 does not differ from conventional, prior art mounting straps.

Areas on three sides of openings 50 and 52 are cut out in a stamping or punching operation which may conveniently be performed as strap 34 is formed, prior to the bending operations which form legs 38 and 40, and ears 42 and 44. Each of the generally U-shaped cut-out areas includes medial portion 54, side portions 56 and 58 in ears 42 and 44, and extensions 60 of the side portions in legs 38 and 40. Thus, openings 50 and 52 are in an area of ears 42 and 44 which may be deformed from the plane of the material outside the cut-out portions. This allows the ends of the ears to rest on the wall surface above and below the wall opening while the mounting screws are tightened, bending the area of the strap between the cut-outs toward the mounting tabs of the box, as shown and described later in more detail.

Ear 62 of a slightly modified form of strap 34 is shown in FIGS. 3 and 4. Openings 48 and 52 are provided in the same locations as in ear 44 of strap 34. Side cut-out portions 56 and 58 are likewise provided on opposite sides of opening 52, and extend downwardly into leg 40, as before. However, rather than providing a medial cut-out portion joining the ends of the side cut-out portions, notch 64 is formed in one surface of ear 62, extending between the ends of the side cut-out portions. Notch 64 provides a weakened section of ear 62 which may be broken when force is applied thereto by tightening the mounting screws. Thus, the action of ear 62 is essentially the same as that of ears 42 and 44 as the strap is fastened to the box, except that the medial portion is not open, but must be broken before the area surrounding the mounting hole is deformed.

FIG. 5 illustrates a typical installation of a wiring device having a mounting strap such as those of FIGS. 2-4. The strap is large enough that the outer edges of ears 42 and 44 rest on the wall surface above and below the wall opening behind which box 66 is installed. Mounting screws 68 and 70 pass through openings 50 and 52 in the ears and are threaded into tapped openings in the mounting tabs of box 66. As the screws are tightened, the areas of the strap within the cut-out portions, denoted by reference numeral 72, is deformed (bent) from the plane of the surrounding material toward the box mounting tabs. Thus, the wiring device is securely fastened to the box, but the wall plate (not shown) may be attached and the device utilized in its intended manner without danger of cracking or breaking.

Ear 74 of FIG. 6 is of the same design as ear 62, and the same reference numerals are applied. In addition, break-off notch 76 is provided to facilitate breaking portion 78 off from the remainder of the ear so that the device can be used in metal boxes with close-fitting covers. The action of ear 74 when installed in a box is the same as that of ear 62.

Although mounting straps are usually made of metal, and serve as a grounding as well as a mounting means, the mounting straps of some devices are plastic, with other means providing the necessary grounding. Receptacle 80 of FIG. 7 includes plastic mounting strap 82, which may be of the "straight-through" type, rather than the "wrap-around" type of FIG. 2. End portions of strap 82 extend from both ends of the receptacle housing, and each end includes mounting screw opening 84, tapped opening 86, and open slots 88 and 90 on opposite lateral sides of opening 84. The ends of slots 88 and 90 nearest receptacle 80 are joined by notch 92, and the ends farthest from the receptacle are joined by notch 94. Both notches 92 and 94 are formed in the lower surface of strap 82, notch 94 being somewhat deeper than notch 92, as seen in FIG. 8. When receptacle 80 is mounted in a box and the mounting screws tightened, the force exerted by the screws causes the strap to break along each of notches 94. The area surrounding mounting holes 84 may then be deformed, bending along notches 92. The type of material used and dimensions such as material thickness and depth of the notches are determined in accordance with the desired operation of strap 82.

Figure 10:
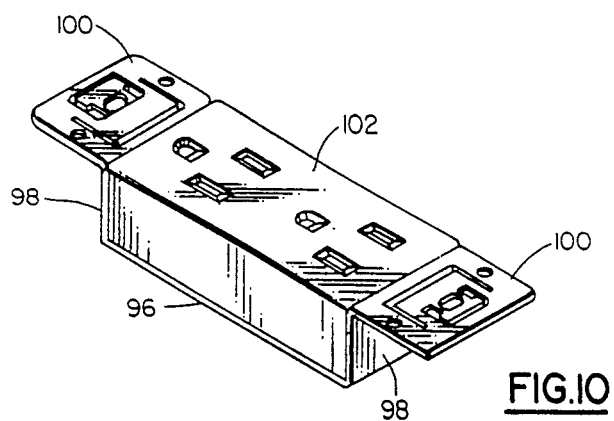
FIG. 10 is a perspective view of a duplex receptacle incorporating a mounting strap of the FIG. 9 design.
Figure 11:
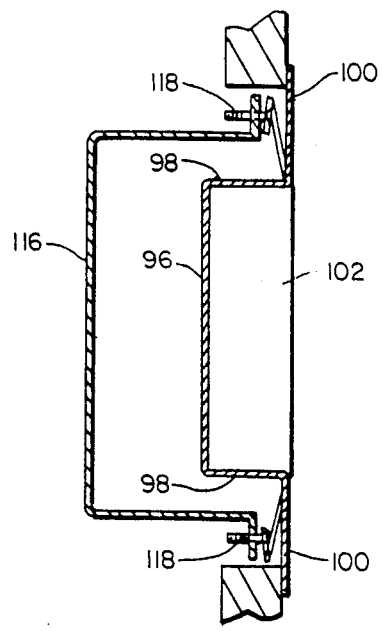
FIG. 11 is a side elevational view, partly in section, of the wiring device of FIG. 10 in a typical installation.

Turning now to FIGS. 9-11, a mounting strap representing the preferred embodiment of the invention is shown. In FIG. 9, the strap is shown in flat form, and in FIG. 10 it is bent to a configuration having medial portion 96, legs 98 and ears 100, for assembly with receptacle 102. The configuration and position of various openings is the same at both ends of the strap, and common reference numerals are used. Openings 104 are provided for loose passage of the mounting screws, and openings 106 receive the screws for attachment of the wall plate. In this embodiment, a pair of U-shaped areas are punched out around the mounting screw openings in a manner providing, in effect, two deformable areas. The U-shaped areas nearest openings 104 include medial portion 108 and side portions 110; the open end of the U faces inwardly, i.e., toward the wiring device. The larger, U-shaped areas farthest from openings 104 include medial portion 112 and side portions 114; the open end of the U faces outwardly, away from the wiring device.

FIG. 11 illustrates the installation of receptacle 102 in box 116. As mounting screws 118, passing through openings 104, are tightened, the central portions of ears 100 surrounding openings 104 is deformed away from the plane of the surrounding material. As previously mentioned, the configuration and arrangement of the cut-out portions provides two bendable areas, i.e., those lying within each of the two U-shaped cut-outs. The material first begins to bend in the areas between the terminal ends of side portions 114 of the outer U-shaped area and medial portion 108 of the inner U-shaped area. As the central section is drawn toward the mounting tab of box 116, the material bends in the areas between the terminal ends of side portions 110 of the inner U-shaped area and the laterally adjacent parts of side portions 114 of the outer U-shaped area. In this manner, the portions of ears 100 immediately surrounding openings 104, such portions being indicated in FIG. 11 by reference numeral 120, may be drawn into tight engagement with the mounting tabs of box 116 since the opposing surfaces are parallel. Likewise, portions 120 are in a plane parallel to but spaced from the plane of the non-deformed portions of ears 100.

From the foregoing, it is apparent that the present invention provides a unique mounting strap, and a wiring device including such a strap, which permits secure fastening of the device to a utility box with the outer surface of the wiring device in a desired position. The strap includes mounting ears or end portions extending in opposite directions from the body of the wiring device with the usual openings for loose passage of the mounting screws. The ears further include a deformable portion surrounding the mounting screw openings and a bendable portion connecting the deformable portion to the mounting ear or other part of the strap. In the preferred embodiment, the deformable portion is separated from the adjacent, outer portions of the ear by a pair of U-shaped, cut-out areas providing bending in two separate areas.

What is claimed is:

1. A mounting strap for incorporation in an electrical wiring device having a body portion with a front surface, said strap comprising:
   (a) a medial portion fixed with respect to said wiring device; and
   (b) a pair of end portions extending outwardly in opposite directions from the body of said wiring device, each of said end portions including:
   (i) a first opening for loose passage of a screw by which said strap may be attached to a utility box positioned behind the plane of a wall surface having a second opening through which said utility box is accessible;
   (ii) a pair of lateral edge portions extending along the sides of said end portion;
   (iii) a terminal edge portion lying farthest from said wiring device, the linear distance between said terminal edge portions of said pair of end portions being greater than the distance across said second opening, whereby said terminal edge portions may contact said wall surface when said end portions are attached to said utility box;
   (iv) a deformable portion lying between said lateral edge portions and between said wiring device and said terminal edge portion, said deformable portion being co-planar with the adjacent parts of said end portion, said first opening lying within said deformable portion;
   (v) a bendable portion by which said deformable portion is connected to an adjoining part of said strap, whereby said deformable portion may be moved relative to and out of the plane of said adjacent parts by bending said bendable portion; and
   (vi) two mutually distinct cut-out portions, by which said deformable portion is separated from said adjacent parts of said end portion, each of said two cut-out portions being essentially U-shaped, the open end of the U of one of said cut-out portions facing toward and the other away from said wiring device.

2. The invention according to claim 1 wherein the legs of both of said U-shaped portions extend substantially parallel to said lateral edge portions, the legs of said one U-shaped portion being positioned closer to said first opening than the legs of said other U-shaped portion.

3. The invention according to claim 2 wherein the medial portion connecting the legs of said one U-shaped portion is positioned between said first opening and said terminal edge portion.

4. A wiring device for mounting in a utility box fixedly positioned behind a building wall having a substantially rectangular opening of predetermined length and width through which said utility box is accessible, said utility box including internally threaded means for receiving a pair of screws which connect said wiring device to said utility box, said wiring device comprising:
   (a) a body portion having a front surface and opposite ends; and
   (b) a mounting strap having a central portion fixedly connected to said body portion and a pair of mounting ears, integrally formed with said central portion and extending outwardly in opposite directions from said opposite ends of said body portion, each of said ears including:
   (i) a mounting screw opening for loose passage of one of said pair of screws;
   (ii) peripheral edge portions defining the peripheral outline of said ear and including lateral edges on opposite sides of said ear;
   (iii) a deformable portion surrounding said mounting screw opening, said deformable portion initially lying in the plane of said peripheral edge portions;
   (iv) a bendable portion by which said deformable portion is connected to an adjoining portion of said strap, said deformable portion being movable relative to and out of said plane of said peripheral edge portions by bending said bendable portion as said screw is tightened in said internally threaded means of said utility box; and
   (v) two mutually distinct cut-out portions by which said deformable portion is separated from said adjacent parts of said ears, each of said two cut-out portions being essentially U-shaped, the open end of the U of one of said cut-out portions facing toward and the other away from said body portion.

5. The invention according to claim 4 wherein the linear distance between the outer extremeties of said ears is greater than said length of said rectangular opening, and the distance between the outer extremeties of said deformable portions is less than the length of said rectangular opening, whereby said deformable portions may be deformed into said rectangular opening while said outer extremeties of said ears remain substantially in the plane of said building wall.

6. The invention according to claim 4 wherein one of said cut-out portions extends continuously on both lateral sides of said mounting screw opening and between said mounting screw opening and said outer extremity of said ear, and the other of said cut-out portions lies between both lateral sides of said one cut-out portion and said lateral edges of said ears and between said mounting screw opening and said wiring device.

7. The invention according to claim 4 wherein each of said cut-out areas is substantially U-shaped, including a pair of substantially linear portions on opposite sides of said mounting screw opening, one of said cut-out areas including a first medial portion joining said linear portions thereof and lying between said mounting screw opening and said outer extremety of said ear, and the other of said cut-out areas including a second medial portion joining said linear portions thereof and lying between said mounting screw opening and said wiring device.

* * * * *